United States Patent
Yoo et al.

(10) Patent No.: US 12,340,623 B2
(45) Date of Patent: Jun. 24, 2025

(54) PUPIL DETECTION DEVICE, OPERATING METHOD OF PUPIL DETECTION DEVICE, AND COMPUTING DEVICE INCLUDING PUPIL DETECTION DEVICE

(71) Applicant: ELECTRONICS AND TELECOMMUNICATIONS RESEARCH INSTITUTE, Daejeon (KR)

(72) Inventors: Jang-Hee Yoo, Daejeon (KR); Cheolhwan Yoo, Daejeon (KR); ByungOk Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 124 days.

(21) Appl. No.: 18/495,521

(22) Filed: Oct. 26, 2023

(65) Prior Publication Data
US 2024/0203162 A1    Jun. 20, 2024

(30) Foreign Application Priority Data
Dec. 15, 2022   (KR) .................. 10-2022-0175688

(51) Int. Cl.
   *G06V 40/19*    (2022.01)
   *G06T 5/70*     (2024.01)
   *G06T 7/70*     (2017.01)
   *G06V 10/82*    (2022.01)

(52) U.S. Cl.
   CPC ............ *G06V 40/19* (2022.01); *G06T 5/70* (2024.01); *G06T 7/70* (2017.01); *G06V 10/82* (2022.01)

(58) Field of Classification Search
   CPC .................................................. G06V 40/19
   USPC .......................................................... 348/78
   See application file for complete search history.

(56) References Cited

U.S. PATENT DOCUMENTS

| 8,398,239 B2 | 3/2013 | Horning et al. |
| 9,864,430 B2 | 1/2018 | Wu et al. |
| 2016/0202756 A1* | 7/2016 | Wu ............... G06F 3/0304 382/103 |

FOREIGN PATENT DOCUMENTS

| EP | 2226703 B1 | 6/2013 |
| KR | 10-1601541 B1 | 3/2016 |

* cited by examiner

*Primary Examiner* — Amir Shahnami
(74) *Attorney, Agent, or Firm* — Rabin & Berdo, P.C.

(57) ABSTRACT

Disclosed is a computing device, which includes a processor, a camera that captures RGB image data, a memory that stores image data including the RGB image data, and a pupil detection device that detects a pupil from the RGB image data stored in the memory in response to a request of the processor. The pupil detection device includes an image converter that receives the RGB image data, detects first eye area data including eye area information from the received RGB image data, and converts the first eye area data into second eye area data having IR (InfraRed) image characteristics by using a deep neural network, a pupil candidate detector that detects pupil candidate data from the second eye area data, and a pupil boundary detector that detects pupil boundary data from the pupil candidate data.

20 Claims, 8 Drawing Sheets

PUPIL DETECTION DEVICE, OPERATING METHOD OF PUPIL DETECTION DEVICE, AND COMPUTING DEVICE INCLUDING PUPIL DETECTION DEVICE

CROSS-REFERENCE TO RELATED APPLICATIONS

This application claims priority under 35 U.S.C. § 119 to Korean Patent Application No. 10-2022-0175688 filed on Dec. 15, 2022, in the Korean Intellectual Property Office, the disclosures of which are incorporated by reference herein in their entireties.

BACKGROUND

Embodiments of the present disclosure described herein relate to a pupil detection device, and more particularly, relate to a pupil detection device for detecting a pupil from an RGB image, a method of operating the pupil detection device, and a computing device including the pupil detection device.

Melanin pigments of the iris surrounding a pupil have characteristics of absorbing wavelengths in the visible band and reflecting wavelengths in the InfraRed (IR) band. The reflectance of the iris increases as the wavelength of infrared illumination increases, and the reflectance of the cornea decreases as the wavelength of infrared illumination increases. In detail, when long-wavelength infrared illumination is used to obtain an image of the eye area, the iris area appears brighter than when short-wavelength illumination is used.

Based on such iris characteristics, most gaze tracking technologies use infrared images. In the case of pupil detection using infrared light, an additional infrared illumination is required in addition to an infrared camera. Therefore, it is difficult to apply the infrared illumination to general users and mobile environments that focus on RGB, such as a webcam environment.

SUMMARY

Embodiments of the present disclosure provide a pupil detection device for detecting a pupil from an RGB image, a method of operating the pupil detection device, and a computing device including the pupil detection device.

According to an embodiment of the present disclosure, a computing device includes a processor, a camera that captures RGB image data, a memory that stores image data including the RGB image data, and a pupil detection device that detects a pupil from the RGB image data stored in the memory in response to a request of the processor.

The pupil detection device includes an image converter that receives the RGB image data, detects first eye area data including eye area information from the received RGB image data, and converts the first eye area data into second eye area data having InfraRed (IR) image characteristics by using a deep neural network (DNN), a pupil candidate detector that detects pupil candidate data from the second eye area data, and a pupil boundary detector that detects pupil boundary data from the pupil candidate data.

According to an embodiment of the present disclosure, a method of operating a pupil detection device includes receiving RGB image data, detecting first eye area data including eye area information from the RGB image data, converting the first eye area data into second eye area data having InfraRed (IR) image characteristics using a deep neural network, detecting pupil candidate data from the second eye area data, and detecting pupil boundary data from the pupil candidate data.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure may be described in detail and clearly to such an extent that an ordinary one in the art easily implements the present disclosure.

Figure 1:
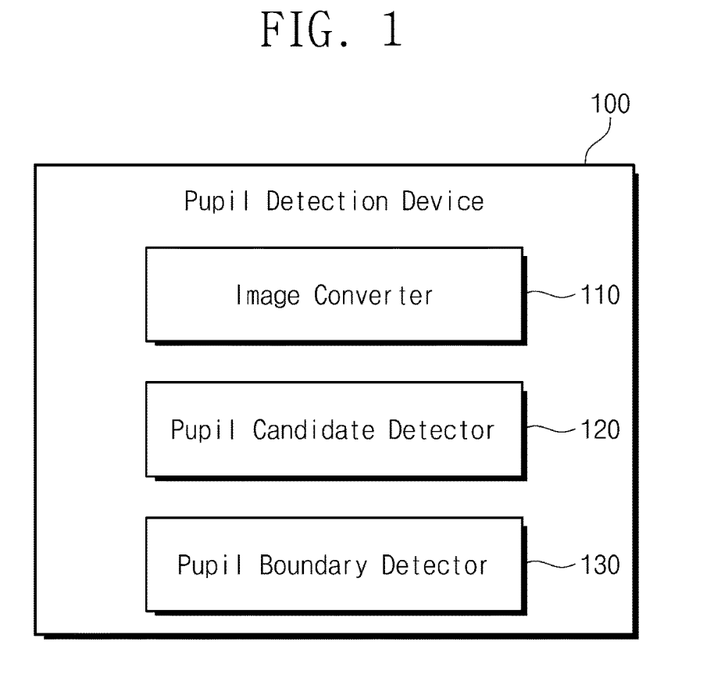
FIG. 1 is a block diagram illustrating a pupil detection device according to an embodiment of the present disclosure.

FIG. 1 is a block diagram illustrating a pupil detection device 100 according to an embodiment of the present disclosure. Referring to FIG. 1, the pupil detection device 100 may include an image converter 110, a pupil candidate detector 120, and a pupil boundary detector 130.

The image converter 110 may receive RGB image data including information of a user's face. The image converter 110 may detect data including eye area information from RGB image data. For example, the image converter 110 may detect first eye area data including eye area information from the RGB image data.

The image converter 110 may convert image data having RGB characteristics into image data having InfraRed (IR) characteristics. For example, the image converter 110 may convert the first eye area data into second eye area data having the IR characteristics by using a deep neural network.

The pupil candidate detector 120 may detect data including information on pupil candidate areas from the eye area data having the IR characteristics. The pupil candidate detector 120 may detect the darkest area among eye area data having the IR characteristics as pupil candidate areas. For example, the pupil candidate detector 120 may detect pupil candidate data including information on pupil candidate areas from the second eye area data having the IR characteristics. In this case, the pupil candidate detector 120 may detect the pupil candidate data from the second eye area data using binarization, a Hough Transform, a Canny boundary line detector, or a deep neural network.

The pupil boundary detector 130 may detect data including pupil information from data including information on the pupil candidate areas.

For example, the pupil boundary detector 130 may detect pupil area information from the pupil candidate data. The pupil boundary detector 130 may detect pupil boundary data including pupil boundary information using a boundary detection algorithm based on the pupil area information.

Figure 2:
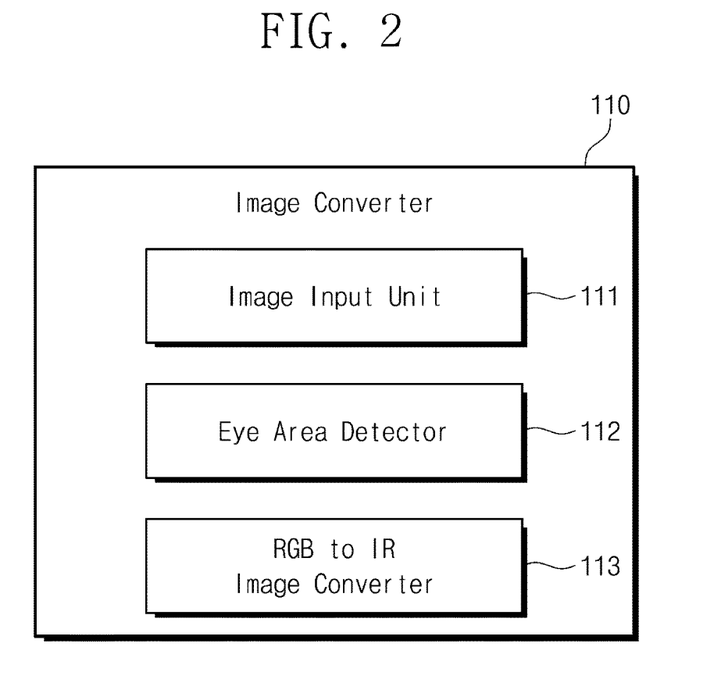
FIG. 2 is a block diagram illustrating an image converter of FIG. 1.

FIG. 2 is a block diagram illustrating the image converter 110 of FIG. 1. Referring to FIGS. 1 and 2, the image converter 110 may include an image input unit 111, an eye area detector 112, and an RGB to IR image converter 113.

The image input unit 111 may receive RGB image data including information of a user's face.

For example, the image input unit 111 may receive RGB image data including information of a user's face from an external device.

For example, the image input unit 111 may receive the RGB image data including information of a user's face from an RGB camera.

The eye area detector 112 may detect eye area data including eye area information from the RGB image data.

For example, the eye area detector 112 may detect the eye area data including the eye area information based on Viola Jones algorithm using an Adaboost-cascade classifier.

For example, the eye area detector 112 may detect the eye area data including the eye area information based on facial landmark detection based on Constrained Local Neural Fields (CLNF) or a deep neural network.

The RGB to IR image converter 113 may convert the eye area data having the RGB characteristics into the eye area data having the IR characteristics using a deep neural network. In this case, the converted eye area data may have a gray scale value.

For example, the RGB to IR image converter 113 may convert first eye area data to second eye area data having the IR characteristics by using deep neural network learning such as an auto-encoder, a convolutional neural network, a generative adversarial network (GAN), Diffusion or NeRF (Neural Radiance Fields). The RGB to IR image converter 113 may use RGB eye area data and IR eye area data as training data for deep neural network learning. Accordingly, the RGB to IR image converter 113 may use an image conversion deep neural network model pretrained through a process of collecting and learning sufficient datasets.

Figure 3:
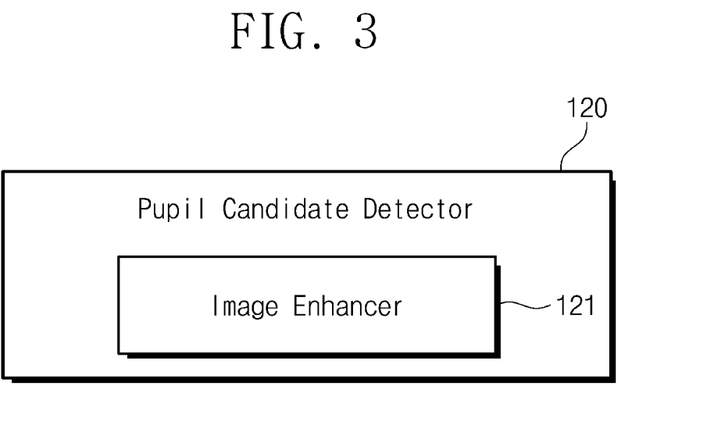
FIG. 3 is a block diagram illustrating a pupil candidate detector of FIG. 1.

FIG. 3 is a block diagram illustrating the pupil candidate detector 120 of FIG. 1. Referring to FIGS. 1 and 3, the pupil candidate detector 120 may include an image enhancer 121.

The image enhancer 121 may perform a preprocessing operation on the eye area data having the IR characteristics.

For example, the image enhancer 121 may perform a preprocessing for operation for removing noise and adjusting brightness on the second eye area data. The image enhancer 121 may perform smoothing, sharpening, histogram operation, etc.

Figure 4:
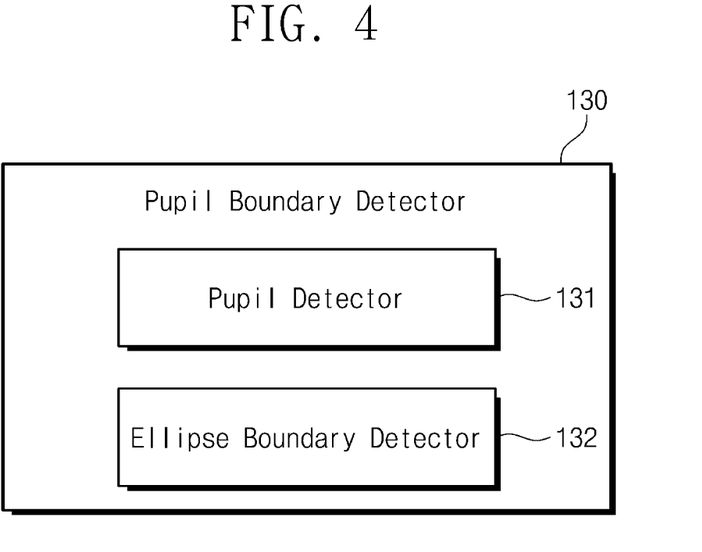
FIG. 4 is a block diagram illustrating a pupil boundary detector of FIG. 1.

FIG. 4 is a block diagram illustrating the pupil boundary detector 130 of FIG. 1. Referring to FIGS. 1 and 4, the pupil boundary detector 130 may include a pupil detector 131 and an ellipse boundary detector 132.

The pupil detector 131 may detect pupil area information from data including information on pupil candidate areas.

For example, the pupil detector 131 may binarize the pupil candidate data. The pupil boundary detector 130 may divide the binarized data into black parts and non-black parts. The pupil detector 131 may determine a part in which a maximum area having a minimum brightness value is greater than or equal to a preset size as a pupil while expanding a circle or an ellipse centered on a central-most part of the black parts. The pupil detector 131 may detect the part determined as the pupil as pupil area information.

The ellipse boundary detector 132 may detect pupil boundary data including pupil boundary information from data including information on pupil candidate areas. For example, the elliptic boundary detector 132 may detect pupil boundary data including pupil boundary information from the binarized pupil candidate data using a boundary detection algorithm.

The ellipse boundary detector 132 may detect pupil boundary data including pupil boundary information based on the pupil area information. For example, the ellipse boundary detector 132 may detect pupil boundary data including pupil boundary information using a boundary detection algorithm based on pupil area information.

Figure 5:
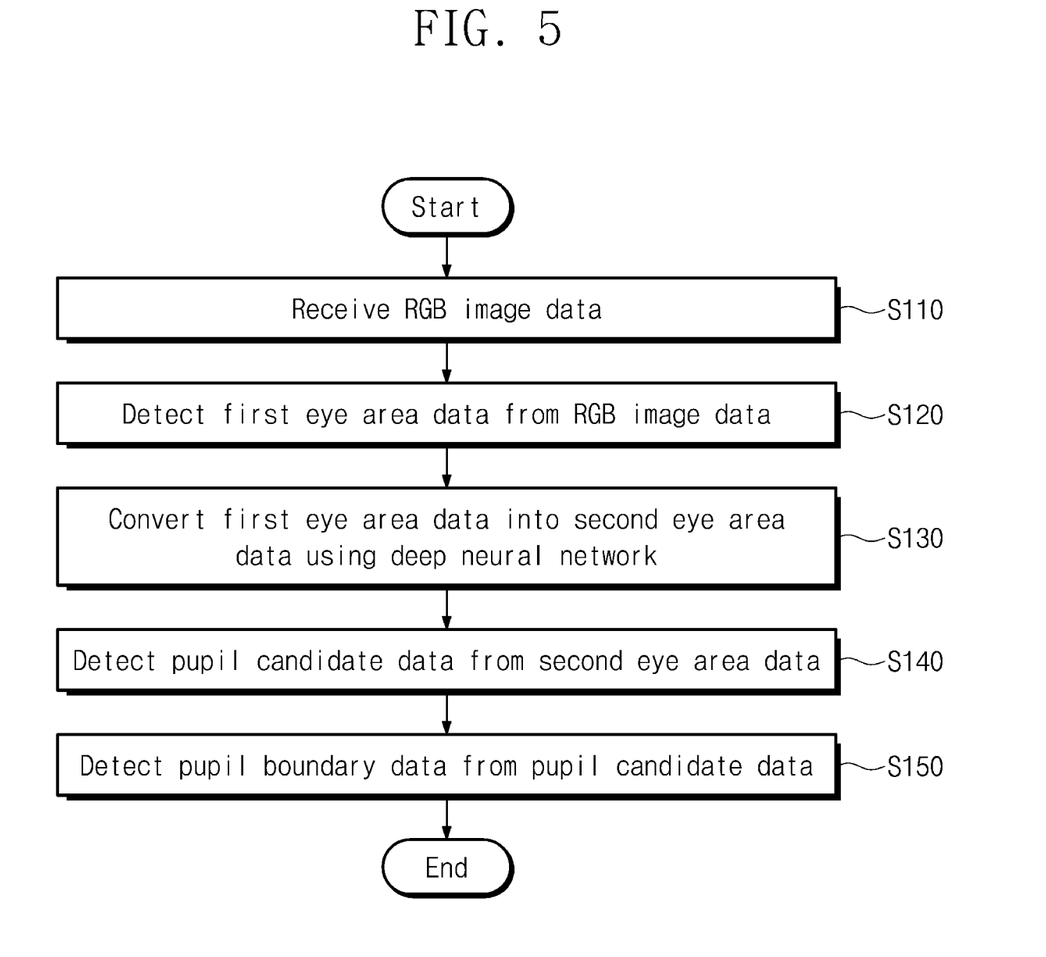
FIG. 5 is a flowchart illustrating an operating method of a pupil detection device of FIG. 1.

FIG. 5 is a flowchart illustrating an operating method of the pupil detection device 100 of FIG. 1. Referring to FIGS. 1 to 5, in operation S110, the pupil detection device 100 may receive RGB image data.

In operation S120, the pupil detection device 100 may detect first eye area data including eye area information from the received RGB image data.

For example, the pupil detection device 100 may detect the first eye area data based on the Viola Jones algorithm using an Adaboost-cascade classifier.

For example, the pupil detection device 100 may detect the first eye area data based on facial landmark detection based on Constrained Local Neural Fields (CLNF) or a deep neural network.

In operation S130, the pupil detection device 100 may convert the first eye area data into second eye area data having IR characteristics using a deep neural network. For example, the pupil detection device 100 may convert first eye area data into second eye area data having the IR characteristics by using deep neural network learning such as an auto-encoder, a convolutional neural network, a generative adversarial network (GAN), Diffusion or NeRF (Neural Radiance Fields).

In operation S140, the pupil detection device 100 may detect pupil candidate data including information on pupil candidate areas from the second eye area data. For example, the pupil detection device 100 may detect pupil candidate data from second eye area data using binarization, a Hough Transform, a Canny boundary line detector, or a deep neural network.

In operation S150, the pupil detection device 100 may detect pupil boundary data from pupil candidate data. For example, the pupil detection device 100 may detect pupil area information from pupil candidate data. The pupil detection device 100 may detect pupil boundary data including pupil boundary information by using a boundary detection algorithm based on pupil area information.

Figure 6:
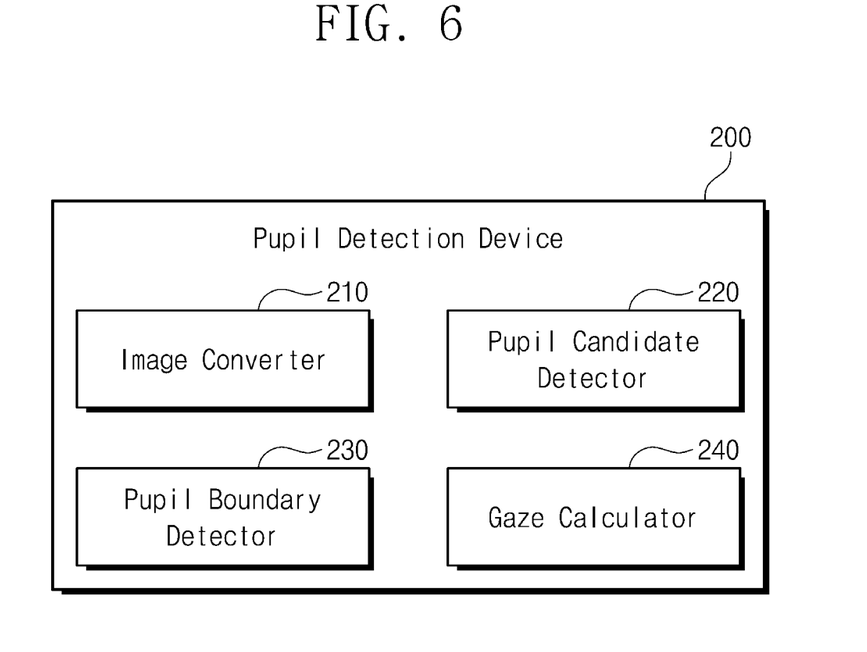
FIG. 6 is a block diagram illustrating a pupil detection device according to an embodiment of the present disclosure.

FIG. 6 is a block diagram illustrating a pupil detection device 200 according to an embodiment of the present disclosure. Referring to FIGS. 1 to 4 and 6, the pupil detection device 200 may include an image converter 210, a pupil candidate detector 220, a pupil boundary detector 230, and a gaze calculator 240.

The image converter 210, the pupil candidate detector 220, and the pupil boundary detector 230 are the same as those described with reference to FIGS. 1 to 4. Therefore, additional descriptions will be omitted to avoid redundancy.

The gaze calculator 240 may calculate gaze data including gaze information from pupil boundary data. The gaze calculator 240 may track a user's gaze by calculating gaze data.

For example, the gaze calculator 240 may detect pupil center data including pupil center position information from pupil boundary data. The gaze calculator 240 may calculate gaze data from pupil boundary data and pupil center data.

Figure 7:
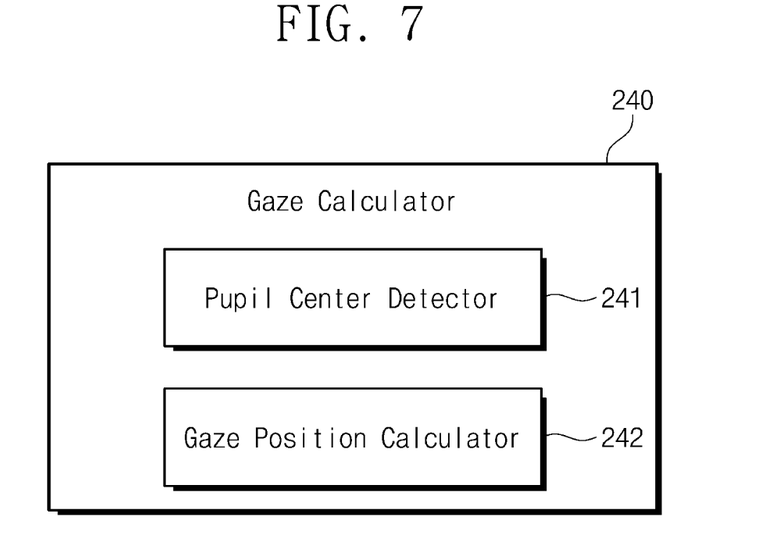
FIG. 7 is a block diagram illustrating a gaze calculator of FIG. 6.

FIG. 7 is a block diagram illustrating the gaze calculator 240 of FIG. 6. Referring to FIGS. 6 and 7, the gaze calculator 240 may include a pupil center detector 241 and a gaze position calculator 242.

The pupil center detector 241 may detect pupil center data including pupil center position information from pupil boundary data.

For example, the pupil center detector 241 may detect length information from pupil boundary data. In this case, the length information may be long-axis information and short-axis information of the pupil boundary. The pupil center detector 241 may detect pupil center data including pupil center position information based on the length information.

The gaze position calculator 242 may calculate gaze data from pupil boundary data and pupil center data.

For example, the gaze position calculator 242 may calculate gaze position information from pupil boundary data and pupil center data using a camera coordinate system and a gaze coordinate system. The gaze position calculator 242 may calculate gaze data based on gaze position information.

For example, the gaze position calculator 242 may calculate gaze position information from pupil center data of both eyes using a regression model. The gaze position calculator 242 may calculate gaze data based on gaze position information.

In the above examples, the gaze calculator 240 may track the user's gaze by calculating gaze data from pupil boundary data.

Figure 8:
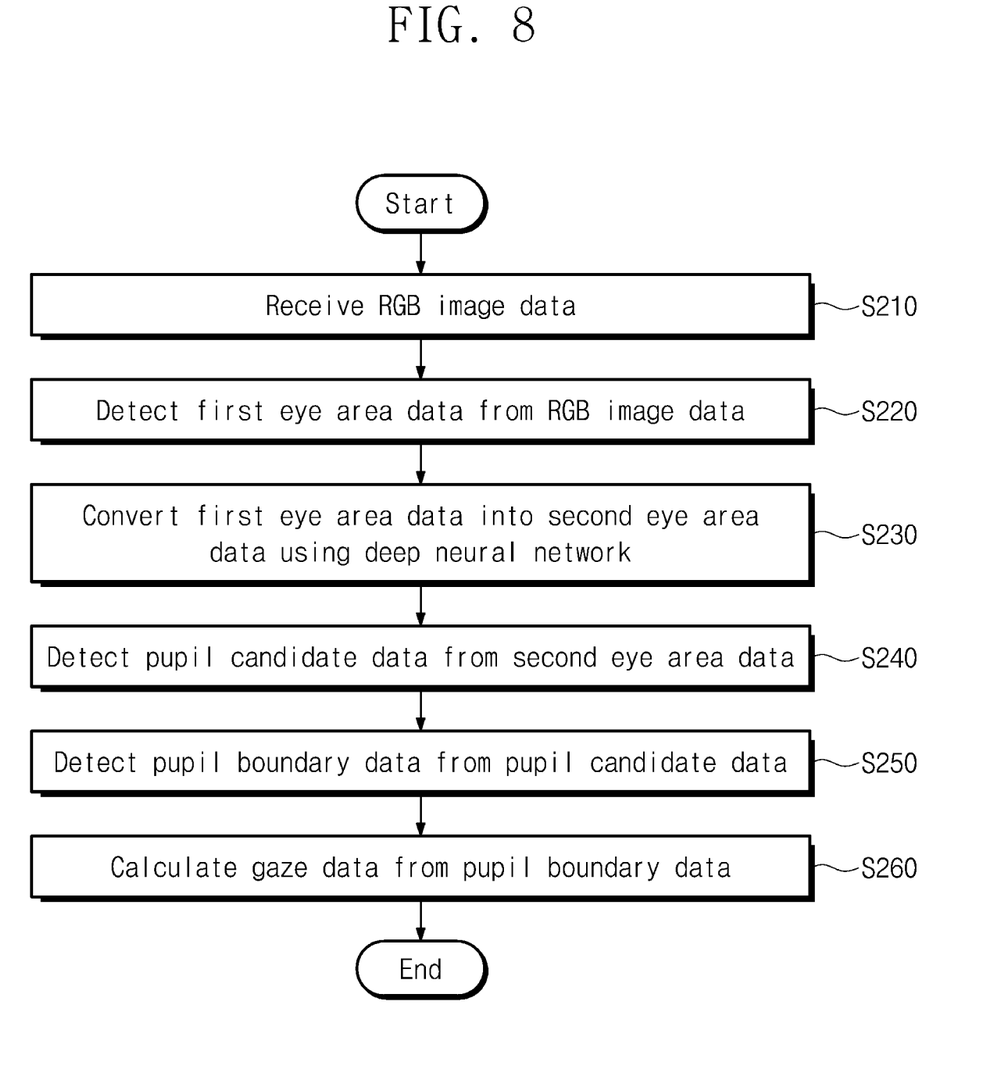
FIG. 8 is a flowchart illustrating an operating method of the pupil detection device of FIG. 6.

FIG. 8 is a flowchart illustrating an operating method of the pupil detection device 200 of FIG. 6.

Operations S210 to S250 are the same as those described with reference to FIG. 5. Therefore, additional descriptions will be omitted to avoid redundancy.

Referring to FIGS. 1 to 8, in operation S260, the pupil detection device 200 may calculate gaze data including gaze information from pupil boundary data.

For example, the pupil detection device 200 may detect pupil center data including pupil center position information from pupil boundary data. The pupil detection device 200 may calculate gaze position information from pupil boundary data and pupil center data. The pupil detection device 200 may calculate gaze data based on gaze position information.

Figure 9:
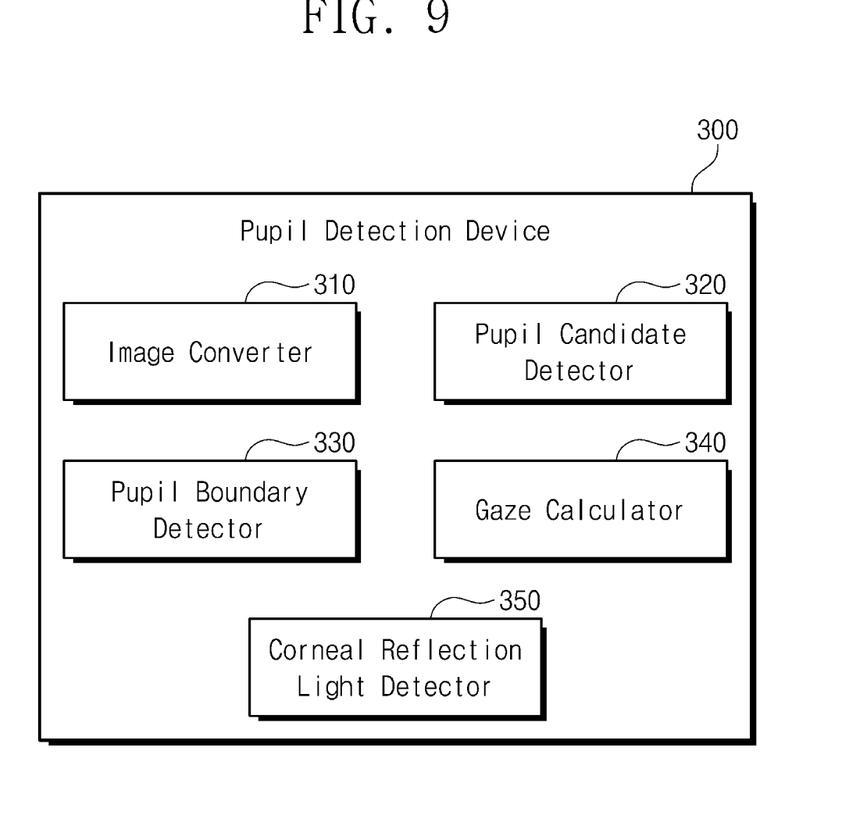
FIG. 9 is a block diagram illustrating a pupil detection device according to an embodiment of the present disclosure.

FIG. 9 is a block diagram illustrating a pupil detection device 300 according to an embodiment of the present disclosure. Referring to FIGS. 1 to 4, 6, 7, and 9, the pupil detection device 300 may include an image converter 310, a pupil candidate detector 320, a pupil boundary detector 330, and a gaze calculator 340, and a corneal reflection light detector 350.

In the pupil detection device 300, the image converter 310, the pupil candidate detector 320, the pupil boundary detector 330, and the gaze calculator 340 are the same as those described with reference to FIGS. 1 to 4, 6 and 7. Therefore, additional descriptions will be omitted to avoid redundancy.

The corneal reflection light detector 350 may detect corneal reflection light data including eye area information of a user from corneal reflection light. For example, when there is illumination, the corneal reflection light detector 350 may detect corneal reflection light data from the corneal reflection light caused by illumination. The corneal reflection light detector 350 may detect corneal reflection light data using binarization and morphology calculation. However, in the case of an RGB image that does not use specific illumination, the corneal reflection light detection process may be omitted.

The corneal reflection light detector 350 may verify the pupil candidate data using the detected corneal reflection light data. For example, the corneal reflection light detector 350 may compare pupil candidate data with corneal reflection light data to verify pupil candidate areas of the pupil candidate data. When the corneal reflection light detection process is omitted, the size ratio of the pupil area or the homogeneity of pixels in the ellipse area may be used.

The pupil boundary detector 330 may detect pupil boundary data based on a comparison result between pupil candidate data and corneal reflection light data.

Figure 10:
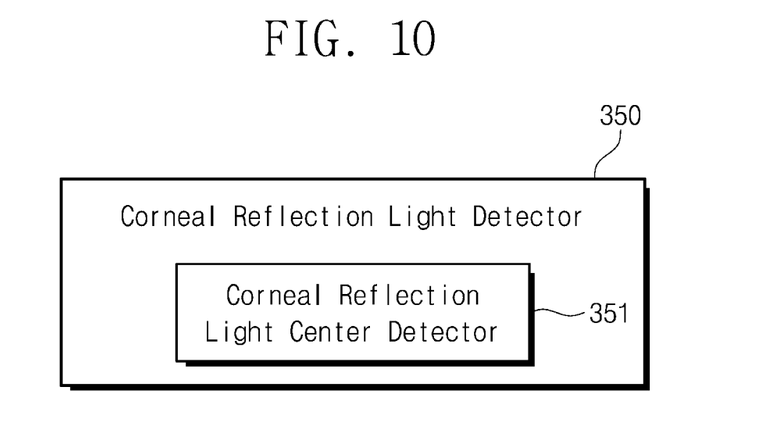
FIG. 10 is a block diagram illustrating a corneal reflection light detector of FIG. 9.

For example, the pupil boundary detector 330 may detect pupil area information based on the comparison result between pupil candidate data and corneal reflection light data. The pupil boundary detector 330 may detect pupil boundary information using a boundary detection algorithm based on the pupil area information. FIG. 10 is a block diagram illustrating the corneal reflection light detector 350 of FIG. 9. Referring to FIGS. 9 and 10, the corneal reflection light detector 350 may include a corneal reflection light center detector 351.

The corneal reflection light center detector 351 may detect center information on the corneal reflection light from the corneal reflection light. For example, when there is illumination, the corneal reflection light center detector 351 may detect center information on the corneal reflection light from the corneal reflection light caused by illumination. In this case, the corneal reflection light detector 350 may detect corneal reflection light data based on center information of the corneal reflection light.

Figure 11:
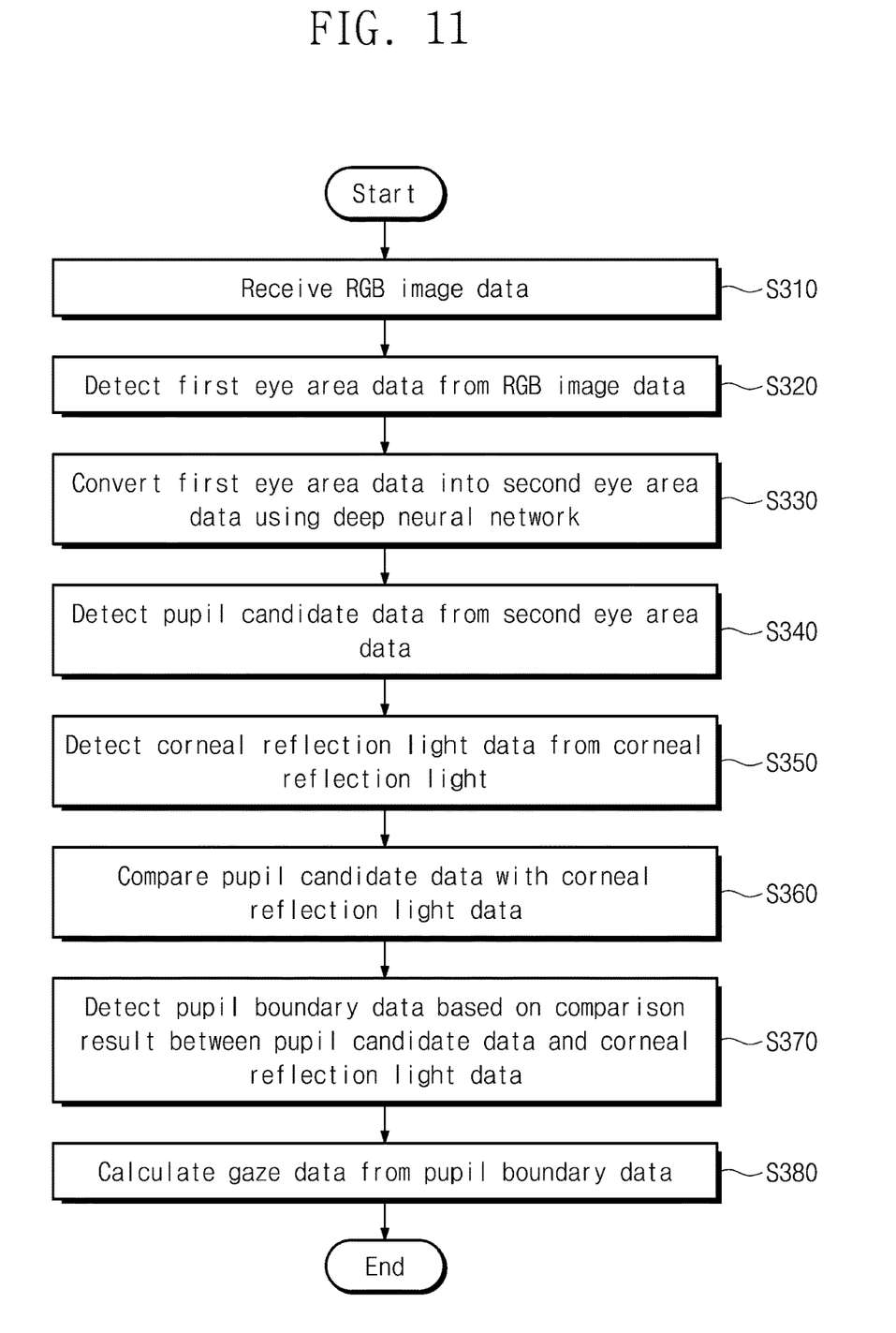
FIG. 11 is a flowchart illustrating an operating method of a pupil detection device of FIG. 9.

FIG. 11 is a flowchart illustrating an operating method of the pupil detection device 300 of FIG. 9. Operations S310 to S340 are the same as those described with reference to FIGS. 5 and 8. Therefore, additional descriptions will be omitted to avoid redundancy.

Referring to FIGS. 1 to 11, in operation S350, the pupil detection device 300 may detect corneal reflection light data including eye area information of the user from the corneal reflection light caused by illumination. The pupil detection device 300 may detect corneal reflection data using binarization and morphology calculation.

In operation S360, the pupil detection device 300 may compare pupil candidate data with corneal reflection light data. The pupil detection device 300 may verify pupil candidate data by comparing pupil candidate data with corneal reflection light data. However, in the case of an RGB image that does not use specific illumination, the corneal reflection light comparison process may be omitted.

In operation S370, the pupil detection device 300 may detect pupil boundary data based on the comparison result between pupil candidate data and corneal reflection light data. For example, the pupil detection device 300 may detect pupil area information based on the comparison result between pupil candidate data and corneal reflection light data. The pupil detection device 300 may detect pupil boundary information using a boundary detection algorithm based on the pupil area information. When the corneal reflection light detection process is omitted, the size ratio of the pupil area or the homogeneity of pixels in the ellipse area may be used.

In operation S380, the pupil detection device 300 may calculate gaze data including gaze information from pupil boundary data. For example, the pupil detection device 300 may detect pupil center data including pupil center position information from pupil boundary data. The pupil detection device 300 may calculate gaze position information from pupil boundary data and pupil center data. The pupil detection device 300 may calculate the gaze data based on the gaze position information.

Figure 12:
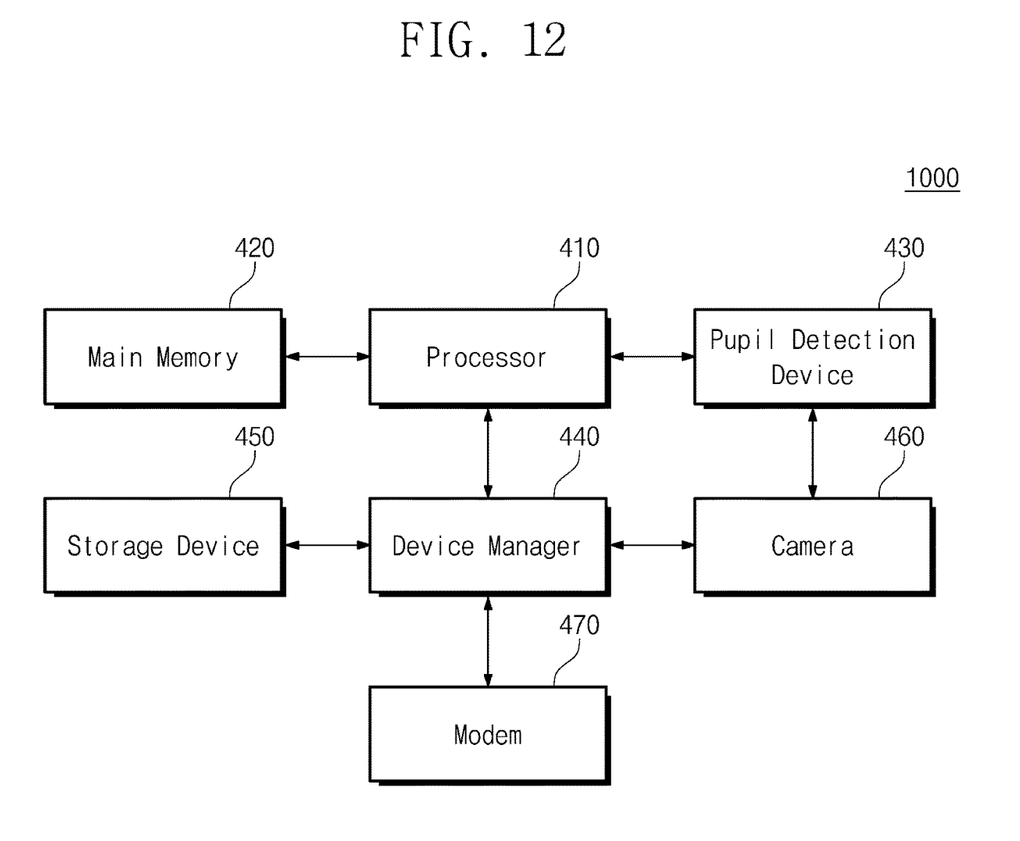
FIG. 12 is a block diagram illustrating a computing device according to an embodiment of the present disclosure.

FIG. 12 is a block diagram illustrating a computing device 1000 according to an embodiment of the present disclosure. Referring to FIG. 12, the computing device 1000 may include a processor 410, a main memory 420, a pupil detection device 430, a device manager 440, a storage device 450, a camera 460, and a modem 470.

The processor 410 may execute an operating system operating the computing device 1000 and various commands and codes. The processor 410 may include an application processor (AP) or a central processing unit (CPU).

The main memory 420 may be a working memory of the processor 410. The main memory 420 may include a dynamic random access memory (DRAM) or a storage class memory (SCM).

The pupil detection device 430 may include the pupil detection device 100, 200 or 300 according to an embodiment of the present disclosure. The pupil detection device 430 may be an auxiliary processor configured to perform the operations, methods or processes described with reference to FIGS. 1 to 12. For example, the pupil detection device 430 may be a graphics processing unit (GPU) or a neural network processing unit (NPU).

The device manager 440 may connect the processor 410 with peripheral devices of the computing device 1000. For example, the device manager 440 may connect the storage device 450, the camera 460, and the modem 470 to the processor 410.

The storage device 450 may be a secondary storage device of the computing device 1000. The storage device 450 may include a hard disk drive (HDD), a solid state drive (SSD), an optical disk drive (ODD), and a removable memory card such as a USB memory.

The camera 460 may be configured to obtain image data by capturing an external scene. For example, the camera 460 may be configured to obtain RGB image data by capturing a user's face.

The modem 470 may be configured to communicate with an external device. For example, the modem 470 may communicate the image data with an external device. Image data acquired by the camera 460 or the modem 470 may be stored in the main memory 420.

The processor 410 may allow the pupil detection device 430 to perform pupil detection on image data stored in the main memory 420. The processor 410 may receive a pupil detection result, for example, pupil boundary data or gaze data, from the pupil detection device 430. The processor 410 may perform subsequent processing using the pupil boundary data or the gaze data. Image data loaded into the main memory 420 may be stored in the storage device 450.

In the above embodiments, components according to the present disclosure are described by using the terms "first", "second", "third", and the like. However, the terms "first", "second", "third", and the like may be used to distinguish components from each other and do not limit the present disclosure. For example, the terms "first", "second", "third", and the like do not involve an order or a numerical meaning of any form.

In the above embodiments, components according to embodiments of the present disclosure are described by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. In addition, the blocks may include circuits composed of semiconductor devices in the IC or circuits registered as an IP (Intellectual Property).

According to an embodiment of the present disclosure, after detecting the eye area from the RGB image, the pupil area may be effectively detected by converting the detected eye area image into an infrared image using a deep neural network.

In addition, according to an embodiment of the present disclosure, a pupil may be effectively detected without an infrared camera and infrared illumination. Therefore, it is possible to implement a gaze tracking application system with improved performance at low cost.

The above-mentioned description refers to embodiments for implementing the scope of the present disclosure. Embodiments in which a design is changed simply or which are easily changed may be included in the scope of the present disclosure as well as an embodiment described above. In addition, technologies that are easily changed and implemented by using the above-mentioned embodiments may be also included in the scope of the present disclosure.

What is claimed is:

1. A computing device comprising:
a processor;
a camera configured to capture RGB image data;
a memory configured to store image data including the RGB image data; and
a pupil detection device configured to detect a pupil from the RGB image data stored in the memory in response to a request of the processor, and
wherein the pupil detection device includes:
an image converter configured to receive the RGB image data, to detect first eye area data including eye area information from the received RGB image data, and to convert the first eye area data into second eye area data having InfraRed (IR) image characteristics by using a deep neural network;
a pupil candidate detector configured to detect pupil candidate data from the second eye area data; and
a pupil boundary detector configured to detect pupil boundary data from the pupil candidate data.

2. The computing device of claim 1, wherein the pupil candidate detector includes an image enhancer configured to perform a preprocessing on the second eye area data.

3. The computing device of claim 2, wherein the preprocessing includes at least one operation of removing noise and adjusting brightness.

4. The computing device of claim 1, wherein the pupil detection device further includes a gaze calculator configured to calculate gaze data including gaze information from the pupil boundary data.

5. The computing device of claim 4, wherein the gaze calculator includes:
a pupil center detector configured to detect length information from the pupil boundary data, and to detect pupil center data including center position information of the pupil based on the length information; and a gaze position calculator configured to calculate gaze position information from the pupil boundary data and the pupil center data, and to calculate the gaze data based on the gaze position information.

6. The computing device of claim 5, wherein the length information includes long axis information and short axis information of the pupil.

7. The computing device of claim 6, wherein the gaze position calculator calculates the gaze position information based on a camera coordinate system and a gaze coordinate system.

8. The computing device of claim 6, wherein the gaze position calculator calculates the gaze position information based on a regression model.

9. The computing device of claim 6, wherein the pupil detection device further includes a corneal reflection light detector configured to detect corneal reflection light data including the eye area information from corneal reflection light by illumination.

10. The computing device of claim 9, wherein the corneal reflection light detector includes a corneal reflection light center detector configured to detect center information of the corneal reflection light, and the corneal reflection data includes the center information of the corneal reflection light.

11. The computing device of claim 10, wherein the corneal reflection light detector compares the pupil candidate data with the corneal reflection light data to verify the pupil candidate data.

12. The computing device of claim 11, wherein the pupil boundary detector further includes:

a pupil detector configured to detect pupil area information including area information of the pupil based on the comparison result; and an ellipse boundary detector configured to detect the pupil boundary data using a boundary detection algorithm based on the pupil area information.

13. A method of operating a pupil detection device, the method comprising:

receiving RGB image data;

detecting first eye area data including eye area information from the RGB image data;

converting the first eye area data into second eye area data having infrared image characteristics using a deep neural network;

detecting pupil candidate data from the second eye area data; and detecting pupil boundary data from the pupil candidate data.

14. The method of claim 13, further comprising:

calculating gaze data including gaze information from the pupil boundary data.

15. The method of claim 14, wherein the calculating of the gaze data including the gaze information from the pupil boundary data includes:

detecting length information from the pupil boundary data;

detecting pupil center data including center position information of the pupil based on the length information;

calculating gaze position information from the pupil boundary data and the pupil center data; and calculating the gaze data based on the gaze position information.

16. The method of claim 15, wherein the length information includes long axis information and short axis information of the pupil.

17. The method of claim 15, further comprising:

after detecting the pupil candidate data, verifying the pupil candidate data.

18. The method of claim 17, wherein the verifying of the pupil candidate data includes:

detecting corneal reflection light data from corneal reflection light by illumination; and comparing the pupil candidate data with the corneal reflection data.

19. The method of claim 18, wherein the detecting of the pupil boundary data from the pupil candidate data includes detecting the pupil boundary data based on the comparison result.

20. The method of claim 19, wherein the detecting of the pupil boundary data based on the comparison result includes:

detecting pupil area data including area information of the pupil based on the comparison result; and detecting the pupil boundary data from the pupil area data based on a boundary detection algorithm.

* * * * *